Oct. 12, 1954    E. J. BETHE ET AL    2,691,189
APPARATUS FOR MAKING REVERSIBLE SPONGE CUSHIONS
Filed April 29, 1952
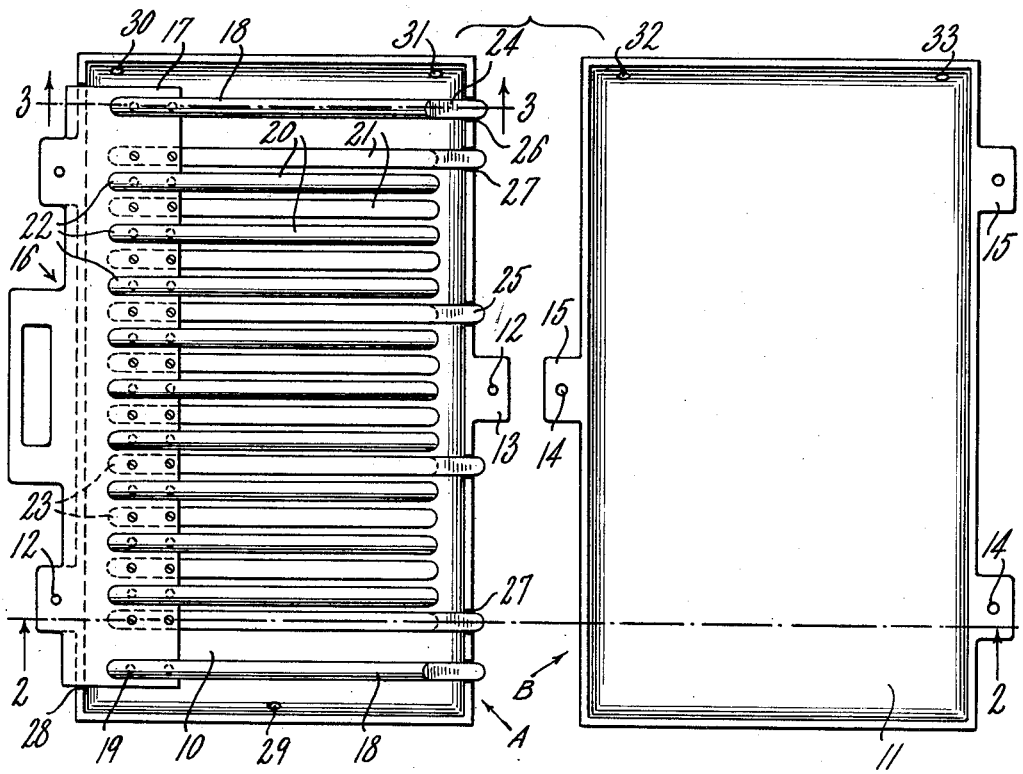
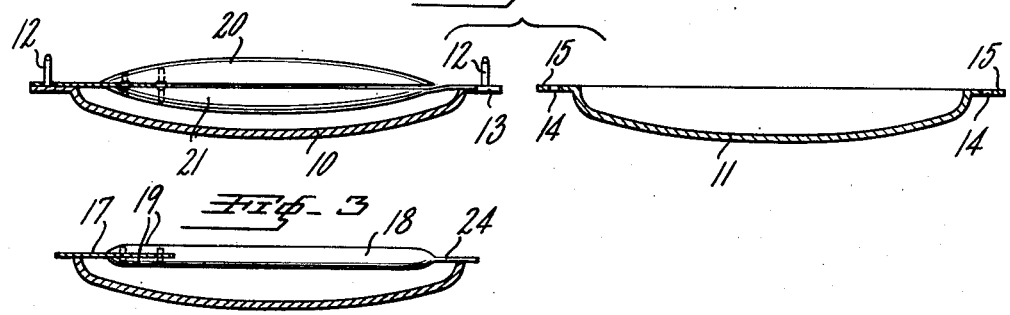
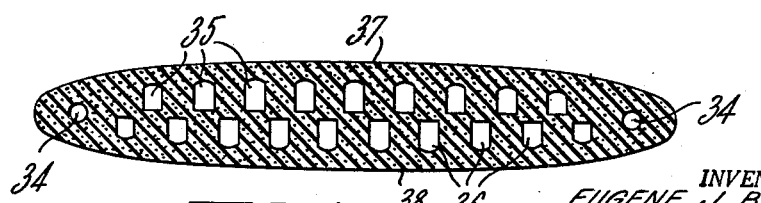
INVENTORS
EUGENE J. BETHE
FRED H. DUTOI
BY Henry M. Leigh
ATTORNEY Patented Oct. 12, 1954

2,691,189

UNITED STATES PATENT OFFICE 2,691,189

APPARATUS FOR MAKING REVERSIBLE SPONGE CUSHIONS

Eugene J. Bethe and Fred H. Dutoi, Mishawaka, Ind., assignors to United States Rubber Company, New York, N. Y., a corporation of New Jersey Application April 29, 1952, Serial No. 284,959

8 Claims. (Cl. 18—38)

This invention relates to apparatus for making reversible one-piece molded cushions of sponge rubber or like material having a plurality of internal spaced tubular-shaped cavities substantially parallel to the faces of the cushions.

Reversible cushions are commonly made by cementing together two molded half-sections of foam sponge cushions at the surfaces containing the openings of the tubular cavities which extend into the cushion body and which are formed by cores extending into the mold proper of the cushion half-section into which the latex foam is poured in the sponge manufacture. Before cementing, the half sections are tested for compression resistance and those having the same resistance are matched. The entire outer surface of such a cushion has a smooth skin formation since the halves were molded against the smooth inside surface of the mold, the only break in the continuity of such smooth outer surface of the cushion being the fine lined butt joint, which is not objectionable, running around the side of the cushion intermediate to the top and bottom faces where the inner surfaces of the half sections were cemented at their edge portions. Such a cushion has a plurality of internal parallel spaced tubular-shaped cavities formed from the cored opening in the molded half-sections. Reversible cushions of various types, seat and back cushions and bed pillows, have been made in this manner, as shown in U. S. Patent 2,295,363. Because two molded half-sections are required to produce each cushion, the damage due to stripping is high. Other disadvantages are that each half-section must be trimmed of flash and carefully matched with another having the same compression resistance and then cemented together. Also, the manufacture of such reversible cushions has an additional disadvantage in the larger number of molds and increased vulcanizer space that are needed.

The object of the present invention is to manufacture in a single molded piece reversible cushions of a spongy-like material having a plurality of internal spaced tubular-shaped cavities substantially parallel to the faces of the cushions, the cavities being produced by a core assembly in the mold that may be removed from inside the finished molded cushion as a single unit. Cushions with the tubular-shaped cavities substantially parallel to the faces of the cushion or to the mid-plane between the faces of the cushion are preferred, particularly for bed pillows and the like, to cushions having tubular cavities at right angles to the mid-plane between the faces of the cushion.

The foregoing and other objects are accomplished as pointed out hereinafter and as shown in the accompanying drawings in which:

Fig. 1 is a top view of a pair of mold sections with a core assembly in position in one mold section;

Fig. 2 is a cross sectional view of the mold sections taken on line 2—2 of Fig. 1;

Fig. 3 is a cross sectional view of the mold section containing the core assembly taken on line 3—3 of Fig. 1; and Fig. 4 is a cross sectional view lengthwise of a cushion made in the mold of Fig. 1.

The cushion of the present invention is preferably made of foamed rubber latex. Foamed rubber latex, natural and/or synthetic, may be prepared by whipping the compounded latex containing a foaming agent into a froth or foam, or by stirring the compounded latex into a separately prepared froth or foam. The latex may also be foamed by chemically evolving a gas in the latex as by the decomposition of hydrogen peroxide or a carbonate in the latex in known manner. The latex from which the foam is prepared or the thus prepared latex foam may have a delayed coagulant or gelling agent added to it before the foam is poured into molds or onto conveyors. The foam may be gelled and vulcanized and the sponge rubber product stripped from the molds or conveyor. The technique of preparing latex foams, and molding and gelling and vulcanizing the same is conventional today as illustrated in various patents, such as U. S. Patents 1,852,447, 2,126,275, 2,290,729, 2,309,005, 2,347,117 and 2,441,235. The reversible cushion of the present invention is molded in a single piece in the mold constructed in accordance with the present invention. On stripping from the mold surface, the cushion will have a desirable smooth outer skin formation from being molded against the smooth inner surface of the mold.

Referring more particularly to the drawings, the cushion mold in open position shown therein is made of metal and comprises two registering cavitied mold sections or halves A and B having inner faces 10 and 11, respectively, against which the faces of the cushion are molded. The mold faces 10 and 11 are of greater linear dimensions, i. e. length or width, than the distance between the mold faces when the mold sections are in register and the mold is in closed position, i. e. depth or thickness of the hollow of the mold. Pins 12 on lugs or ears 13 in the sides of the mold section A at the rim thereof register with holes 14 in the corresponding lugs or ears 15 of the mold section B so that the mold sections may be opened or separated for removal of the finished cushion, and closed in register for filling the hollow formed by the cavities in the mold sections with latex foam for shaping and gelling in the usual manner of making foam sponge cushion. The mold section A is provided with a removable core assembly 16 around which the latex foam is molded when the mold sections are in closed position, and which produces the plurality of internal parallel spaced tubular shaped cavities in the final molded cushion substantially parallel to the mid-plane between the faces of the cushion, or generally parallel to the faces of the cushion.

The core assembly 16 is composed of a plate 17 of thin metal with a plurality of spaced parallel disposed tubular metal cores attached at one end of each core to plate 17 with the cores extending in the same direction from the plate and substantially parallel to the plane of the plate 17. The tubular cores may be of any desired cross section and may be in a single row attached to the plate as at split ends of the cores in the case of thin cushions. For thicker cushions, e. g. pillows about six inches thick, as illustrated in the drawings, the cores will be in two substantially parallel rows with some tubes attached to each face of the plate. In the core assembly shown in the drawings, the two end tubes 18 of the assembly are circular in cross section and are attached to the plate 17 at their split ends 19, while the remaining tubes 20 and 21 are attached at their ends 22 and 23 respectively, to opposite faces of the plate 17 forming two rows of parallel tubes. The tubes 20 and 21 each have a flat side which is in contact with the plate 17 at the attached ends 22 and 23. The tubes 18 and several of the tubes 21 have the ends opposite the ends which are attached to the plate 17 flattened, as at 24 and 25 respectively, so that they may rest in grooves 26 and 27 respectively, channeled to a depth the thickness of the flattened ends in the rim of the mold at the parting line of the mold sections on one side of the mold section A. The rim on the opposite side of the mold section A is grooved at 28 to a depth the thickness of the plate 17 so that the plate 17 rests in the groove. The rim of the mold section A will provide a tight fit at the parting line with the rim of the mold section B when the mold sections are in closed position, and the core assembly will be supported in the hollow of the mold substantially parallel to the plane through the parting line, or to the mid-plane between the inner faces of the mold by the plate 17 and flattened ends 24 and 25 resting in the grooves on the rim of the mold A at the sides thereof. The row of tubes 20 and the row of tubes 21 are positioned at opposite sides of the mid-plane between the inner faces of the mold. It may be seen that communication between the cavities of the mold sections is not severed. Various other means may readily be employed for supporting the core assembly in the hollow of the mold when in closed position while retaining communication between the cavities in mold sections A and B when in closed position to produce an integral molded single piece cushion. Also, the tubular core elements of the core assembly may be supported lengthwise of the mold by grooves in the rim at the ends, instead of being supported widthwise of the mold by the grooves in the rim at sides as shown in the drawings. The tubular core elements will be substantially parallel in either case to the mid-plane between the inner faces 10 and 11 of the mold. The mold section A is provided with a port 29 for the introduction of latex foam into the closed mold. Air vents 30 and 31 in mold section A and air vents 32 and 33 in mold section B aid in filling the mold with foam.

In practice, the core assembly 16 is placed on the grooves 26, 27 and 28 on the sides of the rim of the mold section A, as shown in Figures 1 to 3, and the mold section B is placed on the mold section A with the cavities of the mold sections in register to form the hollow of the mold. Latex foam is introduced into the cavities of the mold sections through the port 29 until foam exudes through air vents 30, 31, 32 and 33. If desired, the two mold sections A and B may be separately filled with foam by pouring into the open sections and the core assembly then positioned in the grooves 26, 27 and 28 on the mold section A. The foam is stiff enough to remain in the mold section B while it is lifted onto the mold section A to form the closed mold. In such case, the entrance port 29 and the air vents 30, 31, 32 and 33 may be omitted from the mold construction, if desired. The mold filled with foam is passed through a heating chamber to gel the foam and vulcanize the cushion, or the foam may be gelled at room temperature on standing in the mold, followed by vulcanization at elevated temperature. After vulcanizing, the cushion is removed from the mold with the core assembly still inside the cushion. The core assembly can be readily removed through the slit in the mid-line at the side of the cushion made by the plate 16 contacting the interior surface of the mold at the groove 28. The open side or slit at the mid-line of the cushion may be cemented together. It is very much easier to strip the cushion from a core assembly where the tubular core elements are parallel to the faces of the cushion, i. e. parallel to the mid-plane between the faces of the cushion, than where the tubular core elements are at right angles to the mid-plane between the faces of the cushion. This is especially the case where the cushions are thick, i. e. about six inches. In making cushions of this thickness, the present mold offers the advantage of easy stripping while still providing the desired distance, generally about one inch, between the external faces of the cushion and the nearest walls of the cavities, which provides the so-called top stock of the cushion.

The finished sponge rubber cushion, after stripping from the core assembly is illustrated in Fig. 4. As shown, the tubular-shaped cavities 34 made by the cores 18 are circular in cross section. The tubular-shaped cavities 35 made by the cores 20 and the tubular-shaped cavities 36 made by the cores 21, are of irregular cross section. The tubular-shaped cavities are substantially parallel to the faces 37 and 38 of the cushion or parallel to the mid-plane between the faces 37 and 38 of the cushion. The sponge rubber between the face 38 and the tops of the cavities 36, and between the face 39 and the bottoms of the cavities 37, as illustrated in Fig. 4, provides the so-called top stock of the desired thickness. The cushion is covered with a skin from being molded against the smooth surface of the mold.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. Apparatus for molding reversible foam sponge cushions having opposite faces comprising registering mold sections having cavities which cooperate to form the hollow of a mold for shaping a foam sponge cushion therein, said mold sections when in register having oppositely disposed inner faces against which the opposite faces of sponge cushions are molded and which are of greater linear dimensions than the distance between said mold faces, a removable unitary core assembly comprising a plurality of spaced substantially parallel disposed tubular cores of greater length than the distance between said inner faces, and means for supporting said core assembly in the hollow of the mold when in closed position with the tubular cores substantially parallel to the mid-plane between the inner faces of the mold while retaining communication between said cavities of said mold sections, two groups of said plurality of tubular cores being positioned solely on opposite sides of the mid-plane between the inner faces of the mold sections when the mold is in closed position.

2. Apparatus for molding reversible foam sponge cushions having opposite faces comprising registering mold sections having cavities which cooperate to form the hollow of a mold for shaping a foam sponge cushion therein, said mold sections when in register having oppositely disposed inner faces against which the opposite faces of sponge cushions are molded and which are of greater linear dimensions than the distance between said mold faces, a removable unitary core assembly comprising a plurality of spaced substantially parallel disposed tubular cores of greater length than the distance between said inner faces, and means for supporting said core assembly in the hollow of the mold when in closed position with the tubular cores substantially parallel to the mid-plane between the inner faces of the mold while retaining communication between said cavities of said mold sections, two groups of said plurality of tubular cores being positioned solely in a row on opposite sides of the mid-plane between the inner faces of the mold sections when the mold is in closed position.

3. Apparatus for molding reversible foam sponge cushions having opposite faces comprising registering mold sections having cavities which cooperate to form the hollow of a mold for shaping a foam sponge cushion therein, said mold sections when in register having oppositely disposed inner faces against which the opposite faces of sponge cushions are molded and which are of greater linear dimensions than the distance between said mold faces, a removable unitary core assembly comprising a plurality of spaced substantially parallel disposed tubular cores of greater length than the distance between said inner faces, and means associated with the parting line of the mold sections for supporting said core assembly in the hollow of the mold when in closed position with the tubular cores substantially parallel to the mid-plane between the inner faces of the mold without completely severing communication between said cavities of said mold sections, two groups of said plurality of tubular cores being positioned solely on opposite sides of the mid-plane between the inner faces of the mold sections when the mold is in closed position.

4. Apparatus for molding reversible foam sponge cushions having opposite faces comprising registering mold sections having cavities which cooperate to form the hollow of a mold for shaping a foam sponge cushion therein, said mold sections when in register having oppositely disposed inner faces against which the opposite faces of sponge cushions are molded and which are of greater linear dimensions than the distance between said mold faces, a removable unitary core assembly comprising two groups of spaced substantially parallel disposed tubular cores of greater length than the distance between said inner faces, and means associated with the parting line of the mold sections for supporting said core assembly in the hollow of the mold when in closed position with the tubular cores substantially parallel to the mid-plane between the inner faces of the mold without completely severing communication between said cavities of said mold sections, said two groups of tubular cores being positioned in rows on opposite sides of the mid-plane between the inner faces of the mold sections when the mold is in closed position.

5. Apparatus for molding reversible foam sponge cushions having opposite faces comprising registering mold sections having cavities which cooperate to form the hollow of a mold for shaping a foam sponge cushion therein, said mold sections when in register having oppositely disposed inner faces against which the opposite faces of sponge cushions are molded and which are of greater linear dimensions than the distance between said mold faces, a removable core assembly comprising a plate and a plurality of spaced tubular cores attached at one end thereof to said plate and extending in the same direction from said plate and substantially parallel to the plane of said plate, and means for positioning a portion of the plate free from said attached tubes at the parting line of the mold sections when in closed position with the tubular cores substantially parallel to the mid-plane between the inner faces of the mold sections while retaining communication between said cavities of said mold sections.

6. Apparatus for molding reversible foam sponge cushions having opposite faces comprising registering mold sections having cavities which cooperate to form the hollow of a mold for shaping a foam sponge cushion therein, said mold sections when in register having oppositely disposed inner faces against which the opposite faces of sponge cushions are molded and which are of greater linear dimensions than the distance between said mold faces, a removable core assembly comprising a plate and two groups of spaced tubular cores attached at one end thereof to said plate and extending in the same direction from said plate and substantially parallel to the plane of said plate, said two groups of tubular cores being attached to opposite faces of said plate, and means for positioning a portion of the plate free from said attached tubes at the parting line of the mold sections when in closed position with the tubular cores substantially parallel to the mid-plane between the inner faces of the mold sections while retaining communication between said cavities of said mold sections.

7. Apparatus for molding reversible foam sponge cushions having opposite faces comprising registering mold sections having cavities which cooperate to form the hollow of a mold for shaping a foam sponge cushion therein, said mold sections when in register having oppositely disposed inner faces against which the opposite faces of sponge cushions are molded and which are of greater linear dimensions than the distance between said mold faces, a removable core assembly comprising a plate and a plurality of spaced tubular cores attached at one end thereof to said plate and extending in the same direction from said plate and substantially parallel to the plane of said plate, and means associated with the registering surface of the mold sections when in closed position for supporting a portion of the plate which is not attached to said ends of said tubular cores and means associated with the registering surfaces of the mold sections when in closed position for supporting the unattached ends of only some of said tubular cores with the plate and tubular cores substantially parallel to the mid-plane between the inner faces of the mold sections without completely severing communication between said cavities of said mold sections.

8. Apparatus for molding reversible foam sponge cushions having opposite faces comprising registering mold sections having cavities which cooperate to form the hollow of a mold for shaping a foam sponge cushion therein, said mold sections when in registering having oppositely disposed inner faces against which the opposite faces of sponge cushions are molded and which are of greater linear dimensions than the distance between said mold faces, a removable core assembly comprising a plate and two groups of spaced tubular cores attached at one end thereof to said plate and extending in the same direction from said plate and substantially parallel to the plane of said plate, said two groups of tubular cores being attached to opposite faces of said plate, and means associated with the registering surface of the mold sections when in closed position for supporting a portion of the plate which is not attached to said ends of said tubular cores and means associated with the registering surfaces of the mold sections when in closed position for supporting the unattached ends of only some of said tubular cores with the plate and tubular cores substantially parallel to the mid-plane between the inner faces of the mold sections without completely severing communication between said cavities of said mold sections.

References Cited in the file of this patent

UNITED STATES PATENTS

| Number | Name | Date |
|---|---|---|
| 1,537,860 | Miller | May 12, 1925 |
| 2,180,304 | Minor | Nov. 14, 1939 |
| 2,364,036 | MacKay | Nov. 28, 1944 |